United States Patent
Hsu et al.

(10) Patent No.: US 8,698,531 B1
(45) Date of Patent: Apr. 15, 2014

(54) INTEGRATED CIRCUIT WITH AUTOMATIC CONFIGURATION AND METHOD THEREOF

(71) Applicant: Aspeed Technology Inc., Hsinchu (TW)

(72) Inventors: Fu-Chou Hsu, Hsinchu (TW); Hung-Ju Huang, Hsinchu (TW); Chung-Yen Lu, Hsinchu (TW)

(73) Assignee: Aspeed Technology, Inc., Hsinchu (TW)

( * ) Notice: Subject to any disclaimer, the term of this patent is extended or adjusted under 35 U.S.C. 154(b) by 0 days.

(21) Appl. No.: 13/759,939

(22) Filed: Feb. 5, 2013

(51) Int. Cl.
*H03K 3/02* (2006.01)

(52) U.S. Cl.
USPC .......................................... 327/198; 327/99

(58) Field of Classification Search
USPC ............... 327/91, 93, 99, 142–143, 198, 199; 370/360, 366, 367
See application file for complete search history.

(56) References Cited

U.S. PATENT DOCUMENTS

| 5,428,748 | A | 6/1995 | Davidson et al. |
| 5,900,739 | A | 5/1999 | Gaglani |
| 6,229,328 | B1 | 5/2001 | Lueders |
| 6,434,632 | B1 | 8/2002 | Hall |
| 6,845,444 | B2 | 1/2005 | Su et al. |
| 6,938,235 | B2 | 8/2005 | Breejen et al. |
| 7,222,275 | B2 * | 5/2007 | Satou ............................. 714/724 |
| 7,467,316 | B2 * | 12/2008 | Rhodes ......................... 713/400 |
| 7,961,012 | B2 * | 6/2011 | Hong et al. ..................... 327/99 |

* cited by examiner

*Primary Examiner* — An Luu
(74) *Attorney, Agent, or Firm* — Muncy, Geissler, Olds & Lowe, P.C.

(57) ABSTRACT

An integrated circuit with automatic configuration is disclosed. The integrated circuit comprises a plurality of controllers and a clock detection device. The controllers share a plurality of common pins. The clock detection device coupled to a specified common pin for performing clock detection operations on an external clock signal through the specified common pin according to a plurality of predetermined thresholds and generating a plurality of control signals to the controllers so that only one controller is enabled and performs signal transmission through the common pins.

15 Claims, 7 Drawing Sheets

INTEGRATED CIRCUIT WITH AUTOMATIC CONFIGURATION AND METHOD THEREOF

BACKGROUND OF THE INVENTION

1. Field of the Invention

The invention relates to integrated circuits, and more particularly, to an integrated circuit with automatic configuration and method thereof.

2. Description of the Related Art

SOCs (system on chip) generally integrate a lot of functions. Therefore, some SOCs are "initialized" or "set up" via configuration pins to configure the SOCs into specific modes of operation or to provide the SOCs with default values during power-on or hardware reset. FIG. 1 is an exemplary diagram showing a conventional SOC 100. In the SOC 100, a first controller 110 and a second controller 120 share a common port 142 via the multiplexer 140 and therefore they cannot be enabled at the same time. Here, the port 142 is an M-pin port (M is a positive integer). When the reset signal is asserted, strap signals containing default values and/or a selection of an enabled controller are written into the strap register 130 via the strap pin 132. After reset, a default configuration is in effect and the strap pin 132 takes on its second role to operate. Assuming that the first controller 110 is selected according to the default configuration. The strap register 130 asserts an enable signal e1 to enable the first controller 110 and de-asserts an enable signal e2 to disable the second controller 120. In the meantime, the strap register 130 generates a corresponding switching signal CS to the multiplexer 140 to allow the first controller 110 to access all the pins on the port 142.

However, the SOC is space consuming and cannot spare many dedicated pins (i.e., strap pins or configuration pins) for the default configuration. Accordingly, what is needed is an integration circuit and method to address the above-identified problems. The invention addresses such a need.

SUMMARY OF THE INVENTION

In view of the above-mentioned problems, an object of the invention is to provide an integrated circuit with automatic configuration by detecting a frequency of an external clock signal after power-on or hardware reset, without using a dedicated pin.

One embodiment of the invention provides an integrated circuit. The integrated circuit comprises a plurality of controllers and a clock detection device. The controllers share a plurality of common pins. The clock detection device coupled to a specified common pin for performing clock detection operations on an external clock signal through the specified common pin according to a plurality of predetermined thresholds and generating a plurality of control signals to the controllers so that only one controller is enabled and performs signal transmission through the common pins.

Another embodiment of the invention provides a method of automatically configuring an integrated circuit. The integrated circuit comprises a plurality of controllers that share a plurality of common pins. the method comprises the steps of: performing clock detection operations on an external clock signal through a specified common pin according to a plurality of predetermined thresholds to generate a plurality of control signals, the control signals comprising a plurality of enable signals and a switching signal, wherein one of the enable signals is asserted and the other enable signals are de-asserted; connecting a corresponding controller with the common pins according to the switching signal; and, enabling the corresponding controller according to the asserted enable signal.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

As used herein and in the claims, the term "a," "an," "the" and similar terms used in the context of the present invention (especially in the context of the claims) are to be construed to cover both the singular and plural unless otherwise indicated herein or clearly contradicted by the context.

A feature of the invention is to automatically configure an integrated circuit by detecting a frequency of an external clock signal after power-on or hardware reset, without using a dedicated pin.

Figure 1:
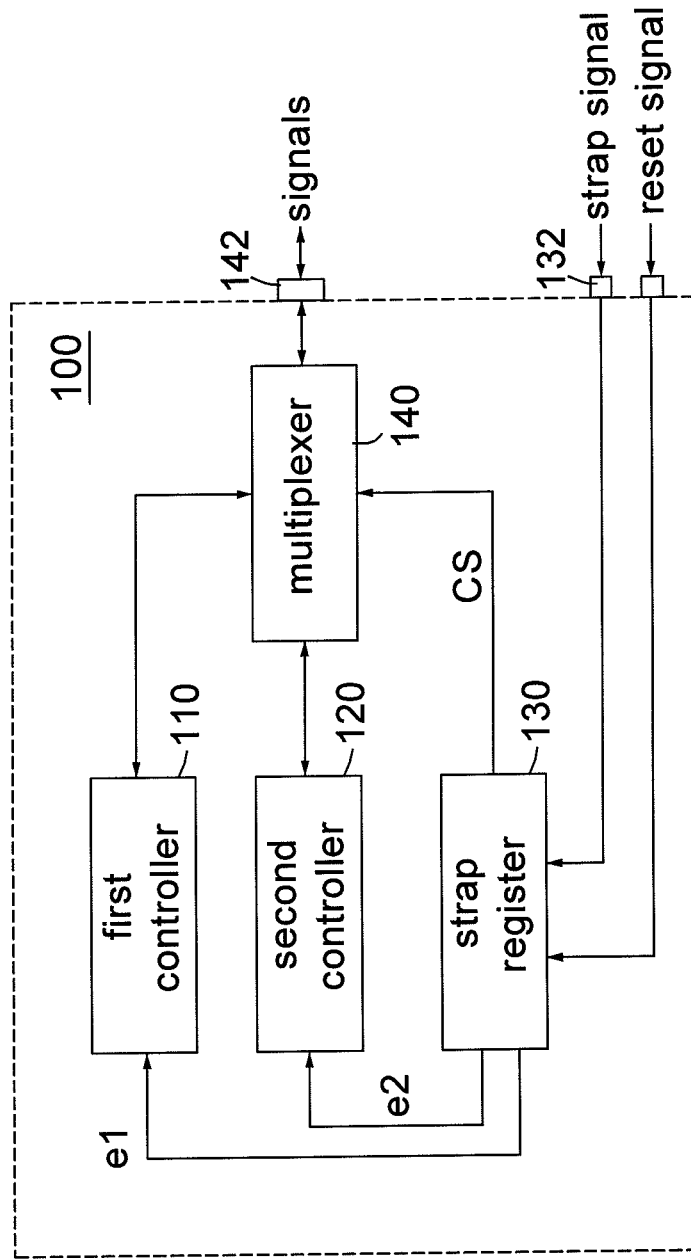
FIG. 1 is an exemplary diagram showing a conventional SOC.
Figure 2A:
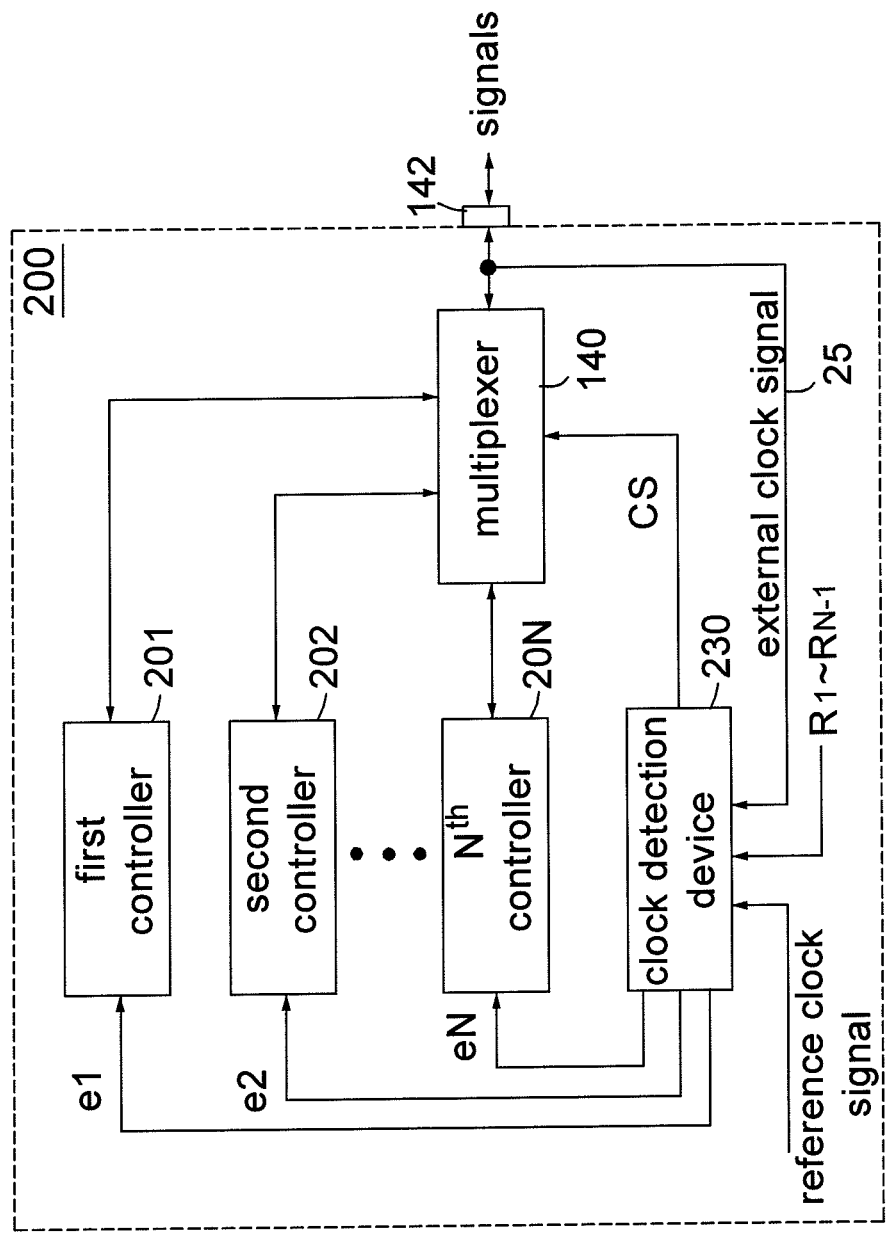
FIG. 2A is a schematic diagram showing an integrated circuit with automatic configuration according to an embodiment of the invention.

FIG. 2A is a schematic diagram showing an integrated circuit with automatic configuration according to an embodiment of the invention. Referring to FIG. 2A, an integrated circuit 200 with automatic configuration of the invention includes N (N>=2, N is a positive integer) controllers 201~20N, a clock detection device 230, a multiplexer 140 and a port 142. The N controllers 201~20N share a common port 142 via the multiplexer 140 and therefore only one controller is enabled at one time. Here, the port 142 is an M-pin port (M is a positive integer) and can be bi-directional or unidirectional depending on different needs.

After power-up or hardware reset, the clock detection device 230 starts to receive a reference clock signal to perform clock detection operations on an external clock signal through a signal line 25 coupled to one pin of the port 142 within a predetermined interval according to a plurality of predetermined thresholds. According to the detection result, the clock detection device 230 generates a corresponding switching signal CS to cause the multiplexer 140 to connect a corresponding controller with port 142. In the meantime, the clock detection device 230 asserts a corresponding enable signal (e1~eN) to enable the corresponding controller and de-asserts the other enable signals to disable the other controllers.

Figure 2B:
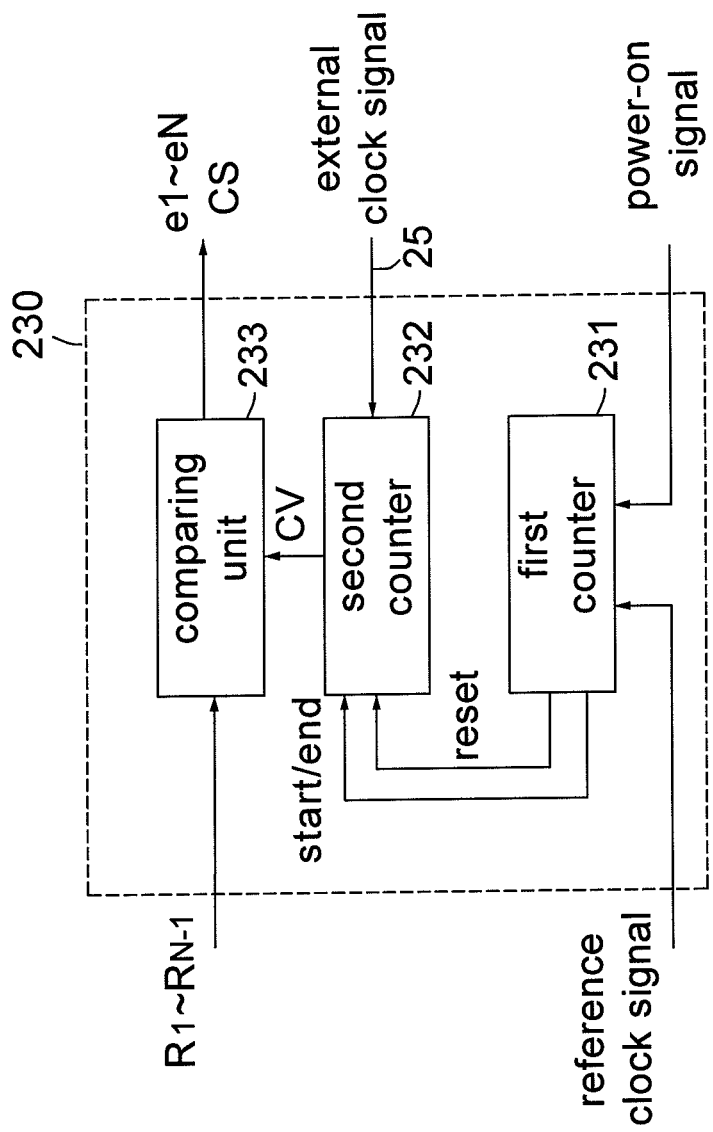
FIG. 2B is a schematic diagram showing a clock detection device according to an embodiment of the invention.

FIG. 2B is a schematic diagram showing a clock detection device according to an embodiment of the invention. Referring to FIG. 2B, a clock detection device 230 of the invention includes a first counter 231, a second counter 232 and a comparing unit 233.

Figure 3A:
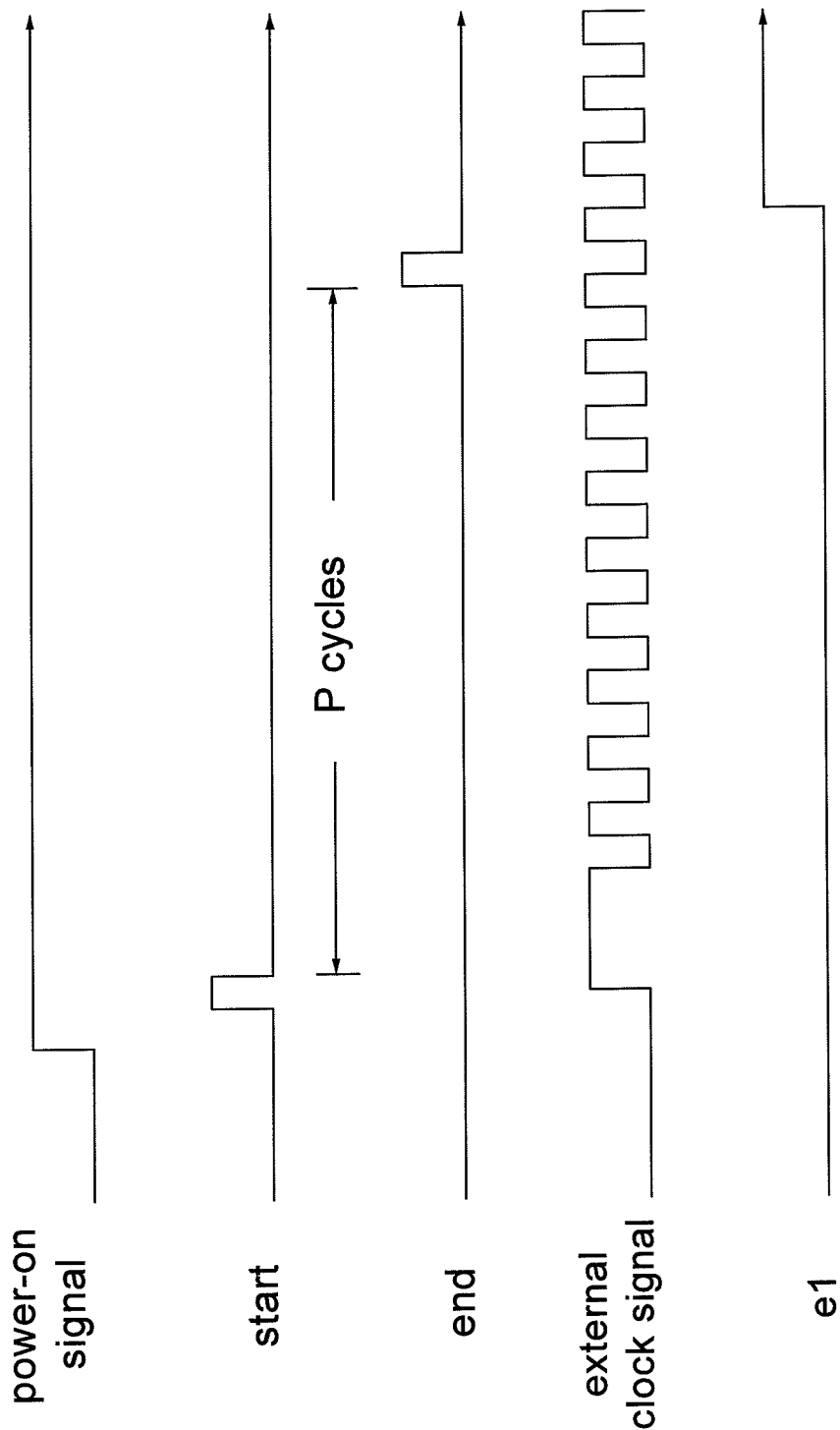
FIG. 3A show an exemplary timing diagram illustrating the relationship of a power-on signal, a start signal, an end signal, a external clock signal and an asserted enable signal e1 when when an external clock signal is supplied.

FIG. 3A show an exemplary timing diagram illustrating the relationship of a power-on signal, a start signal, an end signal, a external clock signal and an asserted enable signal e1 when an external clock signal is supplied from port 142 and the signal line 25.

Assuming that an external cable/plug/bus is plugged into the port 142 before a power-on or hardware reset event and the cable/plug/bus at least transmits an external clock signal to the multiplexer 140 and the clock detection device 230 through the port 142. After power-on or hardware reset, the first counter 231 and a second counter 232 are in a default state. The first counter 231 is used to define the predetermined interval while the second counter 231 is used to count the cycles (CV) of the external clock signal within the predetermined interval. Based on the count CV and the predetermined interval, the frequency of the external clock signal is obtained.

At first, the first counter 231 generates a start signal to cause the second counter 232 to start counting the cycles of the external clock signal. In the meantime, the first counter 231 starts to count the cycles of the reference clock with a fixed frequency F. When the count of the cycles of the reference clock reaches a predetermined value (e.g., P cycles), the first counter 231 stops counting and then generates an end signal to the second counter 232. Here, the fixed frequency F of the reference clock and the predetermined value (e.g., P cycles) define the predetermined interval. Upon receiving the end signal, the second counter 232 stops counting and then generates a corresponding count CV.

Next, the comparing unit 233 compares N different predetermined thresholds $R_1$~$R_{N-1}$ with the count CV to determine which count range the count CV belongs to. The (N-1) predetermined thresholds $R_1$~$R_{N-1}$ determines N count ranges and the N count ranges respectively correspond to the N controllers. Accordingly, the comparing unit 233 asserts a corresponding enable signal, de-asserts the other enable signals and generates a corresponding switching signal CS. Thus, the multiplexer 140 connects a corresponding controller with the port 142 based on the switching signal CS. In the meantime, the corresponding controller is enabled and the other controllers are disabled. Finally, the enabled controller can access all the pins on the port 142 via the multiplexer 140.

Hereinafter, the operations of the integrated circuit 200 are described by way of example and not limitations of the invention. Assuming that N=2 and the first controller 201 is a PCI controller (the PCI bus operates at 33 MHz) and corresponds to a first count range greater than a predetermined threshold $R_1$. Further, assuming that the second controller 202 is a RS-232 controller (a RS-232 connection operates at several hundreds kHz) and corresponds to a second count range less than $R_1$. In a case that the count CV is greater than $R_1$, the comparing unit 233 asserts an enable signal e1, de-asserts the other enable signal e2 and generates a corresponding switching signal CS. Based on the corresponding switching signal CS, the multiplexer 140 connects the enabled first controller 201 with the port 142. Accordingly, the enabled first controller 201 can access all the pins on the port 142 via the multiplexer 140. In a case that the count CV is less than the predetermined threshold $R_1$, the comparing unit 233 asserts an enable signal e2, de-asserts the other enable signal e1 and generates a corresponding switching signal CS. Based on the corresponding switching signal CS, the multiplexer 140 connects the enabled second controller 202 with the port 142. Accordingly, the enabled second controller 202 can access all the pins on the port 142 via the multiplexer 140.

Figure 3B:
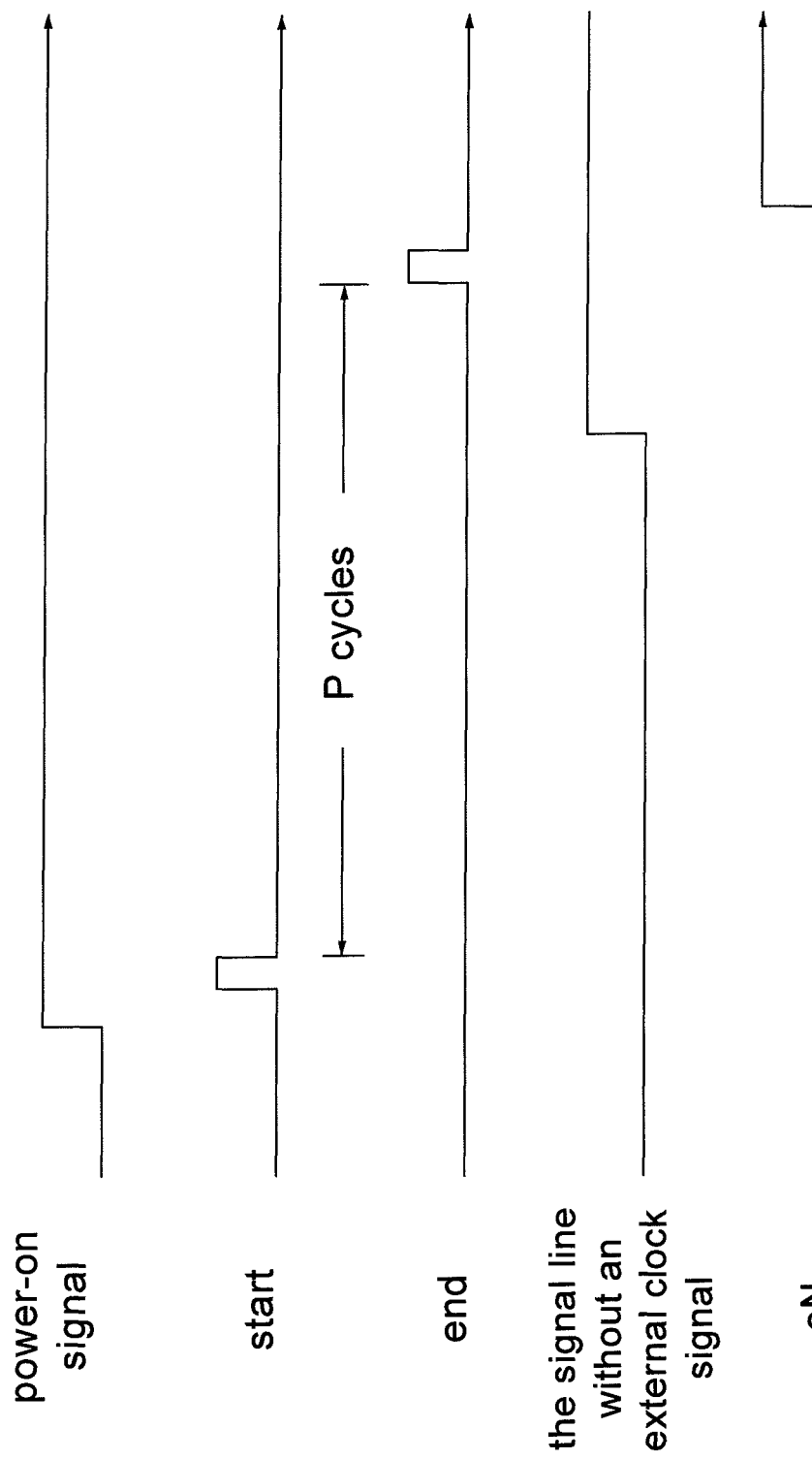
FIG. 3B show another exemplary timing diagram illustrating the relationship of a power-on signal, a start signal, an end signal, the signal line 25 (without an external clock signal being provided from port 142) and an asserted enable signal eN.

FIG. 3B show another exemplary timing diagram illustrating the relationship of a power-on signal, a start signal, an end signal, the signal line 25 (without an external clock signal being provided from port 142) and an asserted enable signal eN. Referring to FIG. 3B, in a case that no external clock signal is provided from port 142 (e.g., no cable is plugged into the port 142) and the signal line 25, even though the second counter 232 may detect few pulses through the signal line 25, it is impossible for the count CV to reach the minimum value of the predetermined thresholds $R_1$~$R_{N-1}$. In an embodiment of FIG. 3B, assuming that a $N^{th}$ controller 20N corresponds to a count range less than the minimum value of the predetermined thresholds $R_1$~$R_{N-1}$. Then, the comparing unit 233 asserts an enable signal eN, de-asserts the other enable signals and generates a corresponding switching signal CS. Based on the corresponding switching signal CS, the multiplexer 140 connects the $N^{th}$ controller 20N with the port 142. The $N^{th}$ controller 20N is enabled and the other controllers are disabled. Accordingly, the enabled $N^{th}$ controller 20N can access all the pins on the port 142 via the multiplexer 140.

Figure 4A:
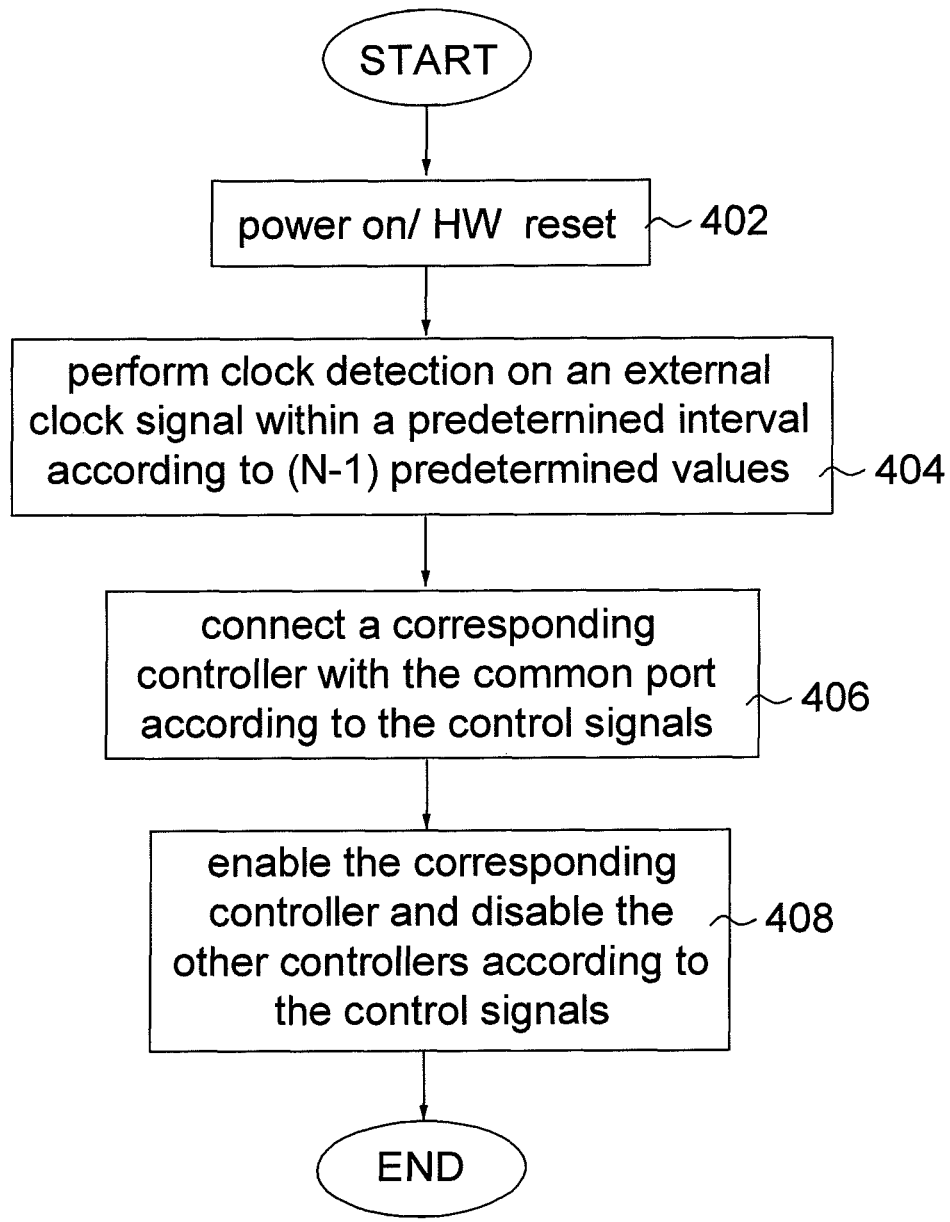
FIG. 4A is a flow chart showing a method of automatically configuring an integrated circuit according to an embodiment of the invention.

FIG. 4A is a flow chart showing a method of automatically configuring an integrated circuit according to an embodiment of the invention. Hereinafter, the method of automatically configuring an integrated circuit is described with reference to FIGS. 2A and 4A.

Step S402: Turn on or reset the integrated circuit 200.

Step S404: Perform clock detection operations on an external clock signal through the signal line 25 within a predetermined interval according to (N-1) predetermined thresholds $R_1$~$R_{N-1}$ to generate a plurality of control signals. In the embodiment of FIG. 2A, the clock detection device 230 calculates the count CV of the cycles of the external clock signal within P cycles of reference clock signal with a fixed frequency F according to (N-1) predetermined thresholds $R_1$~$R_{N-1}$ to generate a plurality of control signals, including a corresponding switching signal CS, an asserted enable signal and (N-1) de-asserted enable signals. Based on the count CV and the predetermined interval, the frequency of the external clock signal is obtained.

Step S406: Connect a corresponding controller with the port 142 according to the control signals. As shown in FIG. 2A, the multiplexer 140 connect the corresponding controller with the port 142 according to the corresponding switching signal CS.

Step S408: Enable a corresponding controller and disable the other controllers according to the control signals. As shown in FIG. 2A, a corresponding controller is enabled and the other controllers are disabled according to the asserted enable signal and the (N-1) de-asserted enable signals.

Figure 4B:
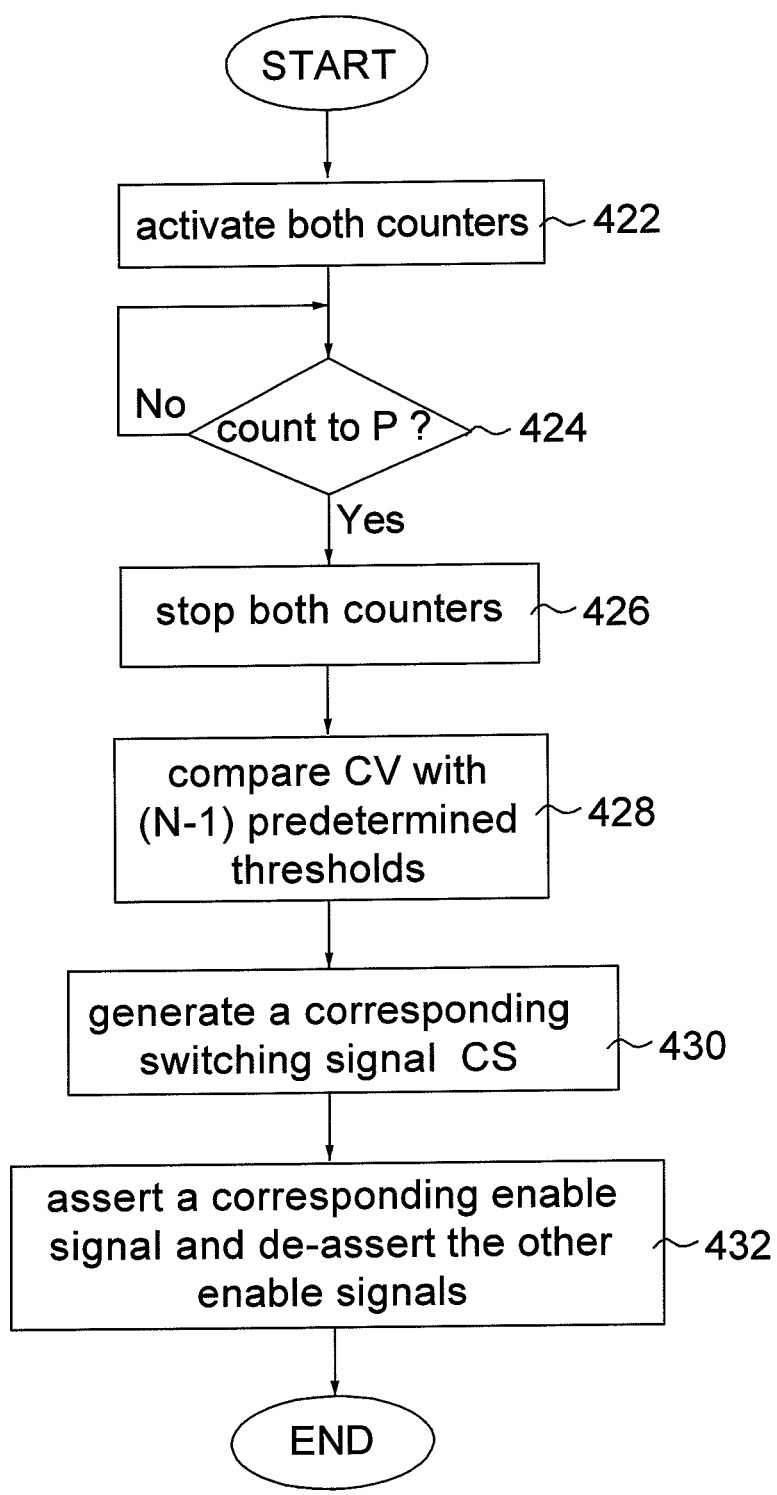
FIG. 4B is a flow chart showing the step of performing clock detection in FIG. 4A.

FIG. 4B is a flow chart showing the step of performing clock detection in FIG. 4A. Hereinafter, the step S404 of performing clock detection is detailed with reference to FIGS. 2A, 2B, 3A, 3B and 4B.

Step S422: Activate the first counter 231 and the second counter 232. The first counter 231 generates a start signal to cause the second counter 232 to start counting the cycles of the external clock signal. In the meantime, the first counter 231 starts to count the cycles of the reference clock with the fixed frequency F.

Step S424: Check whether the current count of the first counter 231 is equal to P. If Yes, go to step S426; otherwise, the flow stays at this step.

Step S426: Stop the first counter 231 and the second counter 232. When a current count of the first counter 231 is equal to P, it means the predetermined interval has expired. Accordingly, the first counter 231 stops counting and then generates an end signal to the second counter 232. Upon receiving the end signal, the second counter 232 stops counting and then generates a count CV.

Step S428: Compare the count CV with the (N-1) predetermined thresholds $R_1 \sim R_{N-1}$ to determine which count range the count CV falls into. Here, the (N-1) predetermined thresholds $R_1 \sim R_{w1}$ determines N count ranges and the N count ranges respectively correspond to the N controllers. After comparison, the comparing unit 233 can determine which count range the count CV belongs to and which controller is to be enabled.

Step S430: Generate a corresponding switching signal CS according to the comparing result of step S428. As shown in FIG. 2B, the comparing unit 233 generates a corresponding switching signal CS to multiplexer 140.

Step S432: Generate an asserted enable signal and (N-1) de-asserted enable signals according to the comparing result of step S428. As shown in FIG. 2B, the comparing unit 233 generates an asserted enable signal and (N-1) de-asserted enable signals to the controllers 201~20N.

According to the invention, one of a plurality of controllers in an integrated circuit is automatically enabled by detecting a frequency of an external clock signal through one of common pins after power-on or hardware reset, without using a dedicated pin.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. An integrated circuit comprising:
a plurality of controllers sharing a plurality of common pins; and
a clock detection device coupled to one of the common pins for performing clock detection operations on an external clock signal through the one common pin according to a plurality of predetermined thresholds and generating a plurality of control signals to the controllers so that only one controller is enabled and performs signal transmission through the common pins.

2. The integrated circuit according to claim 1, comprising:
a multiplexer for connecting one of the controllers to the common pins according to a switch signal;
wherein the plurality of control signals comprise the switching signal.

3. The integrated circuit according to claim 1, wherein the clock detection device performs the clock detection operations on the external clock signal within a predetermined interval, and wherein a number of the controllers is equal to a number of the predetermined thresholds plus one.

4. The integrated circuit according to claim 3, wherein the plurality of control signals comprise a plurality of enable signals, and wherein the clock detection device comprises:
a first counter for receiving a reference clock signal with a fixed frequency and generating a start signal and an end signal;
a second counter coupled to the one common pin for receiving the external clock signal, the start signal and the end signal, counting cycles of the external clock signal and generating a count; and
a comparing unit for comparing the count with the predetermined thresholds to assert a corresponding enable signal and de-assert the other enable signals.

5. The integrated circuit according to claim 4, wherein the first counter counts cycles of the reference clock signal to a predetermined value between generations of the start signal and the end signal, and wherein the predetermined value and the fixed frequency define the predetermined interval.

6. The integrated circuit according to claim 1, wherein the predetermined thresholds determine a plurality of count ranges, and wherein the plurality of count ranges respectively correspond to the plurality of the controllers.

7. The integrated circuit according to claim 1, wherein the clock detection device performs the clock detection operations after the integrated circuit is turned on or reset.

8. A method of automatically configuring an integrated circuit, the integrated circuit comprising a plurality of controllers that share a plurality of common pins, the method comprising:
performing clock detection operations on an external clock signal through one of the common pins according to a plurality of predetermined thresholds to generate a plurality of control signals, the control signals comprising a plurality of enable signals and a switching signal, wherein one of the enable signals is asserted and the other enable signals are de-asserted;
connecting a corresponding controller with the common pins according to the switching signal; and
enabling the corresponding controller according to the asserted enable signal.

9. The method according to claim 8, further comprising:
disabling the other controllers according to the de-asserted enable signals.

10. The method according to claim 8, wherein the step of connecting comprises:
connecting the corresponding controller to the common pins through a multiplexer according to the switch signal.

11. The method according to claim 8, wherein the step of performing comprises:
performing the clock detection operations within a predetermined interval.

12. The method according to claim 11, wherein the step of performing the clock detection operations comprises:
counting the cycles of the external clock signal within the predetermined interval to obtain a count; and
comparing the count with the predetermined thresholds to generate the control signals.

13. The method according to claim 12, wherein the step of performing the clock detection operations further comprises:
counting cycles of a reference clock signal with a fixed frequency to a predetermined value so as to define the predetermined interval.

14. The method according to claim 8, wherein the predetermined thresholds determines a plurality of count ranges, and wherein the plurality of count ranges respectively correspond to the plurality of the controllers.

15. The method according to claim 8, further comprising:
turning on or resetting the integrated circuit before the step of performing the clock detection operations.

* * * * *